(12) United States Patent
Manzo

(10) Patent No.: US 10,310,818 B2
(45) Date of Patent: Jun. 4, 2019

(54) FLOATING POINT CHAINED MULTIPLY ACCUMULATE

(71) Applicant: ARM Limited, Cambridge (GB)

(72) Inventor: Felix Segundo Missel Manzo, Cambridge (GB)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 15/653,757

(22) Filed: Jul. 19, 2017

(65) Prior Publication Data

US 2019/0026077 A1    Jan. 24, 2019

(51) Int. Cl.
| | |
|---|---|
| G06F 9/30 | (2018.01) |
| G06F 7/483 | (2006.01) |
| G06F 7/499 | (2006.01) |
| G06F 7/544 | (2006.01) |

(52) U.S. Cl.
CPC .......... *G06F 7/5443* (2013.01); *G06F 7/4836* (2013.01); *G06F 7/49957* (2013.01); *G06F 9/3001* (2013.01); *G06F 9/30196* (2013.01)

(58) Field of Classification Search
None
See application file for complete search history.

(56) References Cited

U.S. PATENT DOCUMENTS 6,115,729 A * 9/2000 Matheny ............... G06F 7/5443
708/501

\* cited by examiner

*Primary Examiner* — Michael D. Yaary
(74) *Attorney, Agent, or Firm* — Nixon & Vanderhye P.C.

(57) ABSTRACT

Floating point chained multiply accumulation is performed using a multiplier to multiply a first floating point operand by a second floating point operand to generate an unrounded multiplication result. An adder then adds a third floating point operand to the unrounded multiplication result to generate an unrounded accumulation result. Rounding circuitry then applies both the rounding associated with the unrounded multiplication result and rounding associated with the unrounded accumulation result to generate a rounded accumulation result.

14 Claims, 8 Drawing Sheets

FLOATING POINT CHAINED MULTIPLY ACCUMULATE

BACKGROUND

Technical Field

This disclosure relates to the field of data processing systems. More particularly, this disclosure relates to floating point arithmetic circuitry and methods.

Technical Background

It is known to provide data processing systems with the capability to perform floating point multiply accumulate operations. Such floating point multiply accumulate operations include floating point fused multiply accumulate operations which can be considered to break down into three portions, namely a multiply operation, an accumulate operation and a final rounding operation. Another form of floating point multiply accumulation operation is a floating point chained multiply accumulate operation. Such a floating point chained multiple accumulate operation can be considered to break down into four operations, namely a multiply operation, a rounding of the multiply result, an accumulate operation and a rounding of the accumulate result.

SUMMARY

At least some example embodiments of the present disclosure provide apparatus for performing a floating point chained multiply accumulate operation, said apparatus comprising:

a multiplier to multiply a first floating point operand by a second floating point operand to generate an unrounded multiplication result;

an adder to add a third floating point operand and said unrounded multiplication result to generate an unrounded accumulation result; and rounding circuitry to generate:
multiplication rounding data indicative of rounding associated with said unrounded multiplication result;
accumulation rounding data indicative of rounding associated with said unrounded accumulation result; and
a rounded accumulate result from said unrounded accumulate result, said multiplication rounding data, and said accumulation rounding data.

At least some example embodiments of the present disclosure provide apparatus for performing a floating point chained multiply accumulate operation, said apparatus comprising:

multiplier means for multiplying a first floating point operand by a second floating point operand to generate an unrounded multiplication result;

adder means for adding a third floating point operand and said unrounded multiplication result to generate an unrounded accumulation result; and rounding means for generating:
multiplication rounding data indicative of rounding associated with said unrounded multiplication result;
accumulation rounding data indicative of rounding associated with said unrounded accumulation result; and
a rounded accumulate result from said unrounded accumulate result, said multiplication rounding data, and said accumulation rounding data.

At least some example embodiments of the present disclosure provide a method of performing a floating point chained multiply accumulate operation, said apparatus comprising:

multiplying a first floating point operand by a second floating point operand to generate an unrounded multiplication result;

adding a third floating point operand and said unrounded multiplication result to generate an unrounded accumulation result; and generating:
multiplication rounding data indicative of rounding associated with said unrounded multiplication result;
accumulation rounding data indicative of rounding associated with said unrounded accumulation result; and
a rounded accumulate result from said unrounded accumulate result, said multiplication rounding data, and said accumulation rounding data.

Further aspects, features and advantages of the present technique will be apparent from the following description of examples, which is to be read in conjunction with the accompanying drawings.

DESCRIPTION OF EXAMPLES

Figure 1:
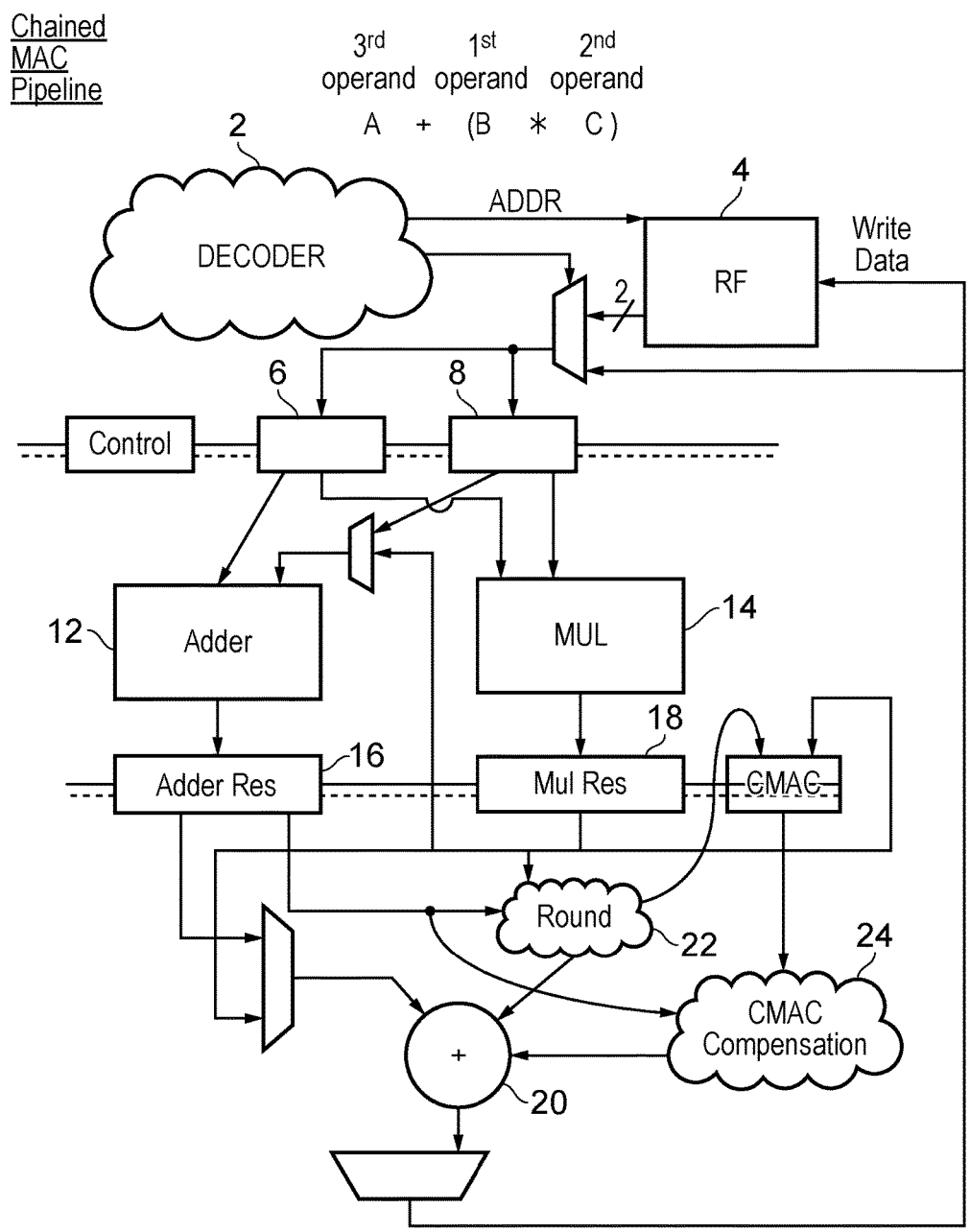
FIG. 1 schematically illustrates a floating point chained multiply accumulate pipeline circuitry.

FIG. 1 schematically illustrates processing circuitry for performing a floating point chained multiply accumulate operation. This processing circuitry will typically form a part of the floating point arithmetic pipeline within a processor core. It will be appreciated that such a processor core typically includes a large number of other sections of circuitry and systems; these are omitted from FIG. 1 for the sake of clarity. The floating point chained multiply accumulate pipeline of FIG. 1 comprises decoder circuitry 2 for decoding a program instruction specifying a floating point chained multiply accumulate operation to be performed. The decoder circuitry 2 responds to the decoding of such an instruction to generate control signals which then control the other portions of the pipeline circuitry illustrated in FIG. 1 to perform the operations described below to perform the specified floating point chained multiply accumulate operation. A floating point register file 4 stores three floating point input operands A, B and C to the floating point chained multiply accumulate operation as well as storing the final rounded floating point accumulation result generated by execution of the instruction. The floating point register file 4 provides two read ports permitting up to two floating point numbers to be read from the floating point register file 4 in parallel. In the case of an instruction which requires three input operands, these require reading during at least two processing clock cycles when using the floating point register file 4 of FIG. 1.

The floating point operands read from the floating point register file 4 are stored into input operand registers 6, 8. An adder-input multiplexer 10 also provides the capability of recirculating a multiplication result back to form one input to an adder 12 when performing a multiply accumulate operation. The input operands from the input operand registers 6, 8 may be supplied to either the adder 12 or a multiplier 14. The adder 12 adds the two input operands it receives to form an unrounded accumulation result stored within unrounded accumulation result register 16. The multiplier 14 multiplies the two input operands it receives to form an unrounded multiplication result which is stored within unrounded multiplication result register 18.

The final stage of the pipeline illustrated in FIG. 1 provides rounding circuitry having a variety of different components. The components of the rounding circuitry include a carry-save adder 20, rounding value determining circuitry 22 and chained multiply accumulate compensation circuitry 24. The rounding value determination circuitry 22 serves to generate multiplication rounding data derived from the unrounded multiplication result and accumulation rounding data derived from the unrounded accumulate result. More particularly, these two instances of rounding data comprise respective rounding bit values to be added to a result as part of rounding and a significance indicating the bit significance of this rounding bit. The chained multiply accumulate carry compensating circuitry 24 serves to perform any required shift, or other adjustment, to the multiplication rounding data generated from the unrounded multiplication result before this is added in to generate the final result by the carry-save adder 20. As an example, the significance of the rounding bit associated with the multiplication rounding data may indicate that the multiplication rounding bit should be added in at a different position within the carry-save adder 20 compared to the rounding bit from the accumulation rounding data.

In a conventional floating point chained multiply accumulate operation the rounding associated with the result of the multiply operation is applied to the unrounded multiplication result to form a rounded multiplication result before that rounded multiplication result is used as an input to the accumulate operation. In accordance with the present technique, the rounding associated with the multiply operation is performed after the accumulate operation has been performed and together with the rounding associated with that accumulate operation. Accordingly, the floating point chained multiply accumulate operation of the present technique can be considered to comprise three phases, namely a multiply phase, an accumulate phase and a rounding phase which performs rounding associated with both the intermediate multiplication result and the final accumulation result.

Figure 2:
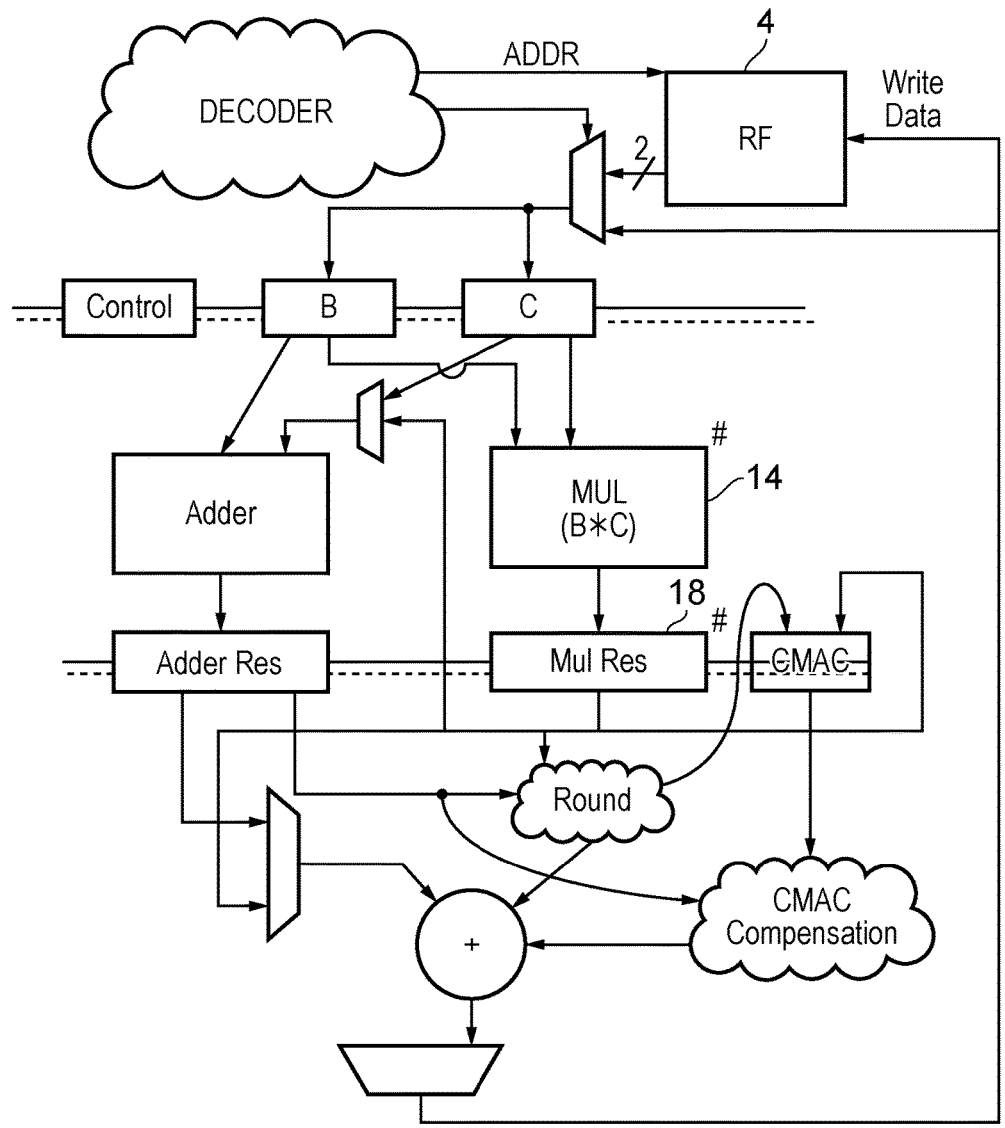
FIGS. 2, 3 and 4 schematically illustrate the circuitry of FIG. 1 during respectively first, second and third processing clock cycles when performing a floating point chained multiply accumulate operation.

FIG. 2 schematically illustrates the circuitry of FIG. 1 during a first processing clock cycle performing a floating point chained multiply accumulate operation. During this processing clock cycle a first input operand B and a second input operand C are read from the floating point register file 4 and supplied to the multiplier 14. The multiplier 14 multiplies these two input operands B, C together and generates an unrounded multiplication result which is stored within the unrounded multiplication result register 18. Thus, during the first processing clock cycle, the multiplier 14 and the unrounded multiplication result register 18 serve to generate and store an unrounded multiplication result from the first input operand B and the second input operand C.

Figure 3:
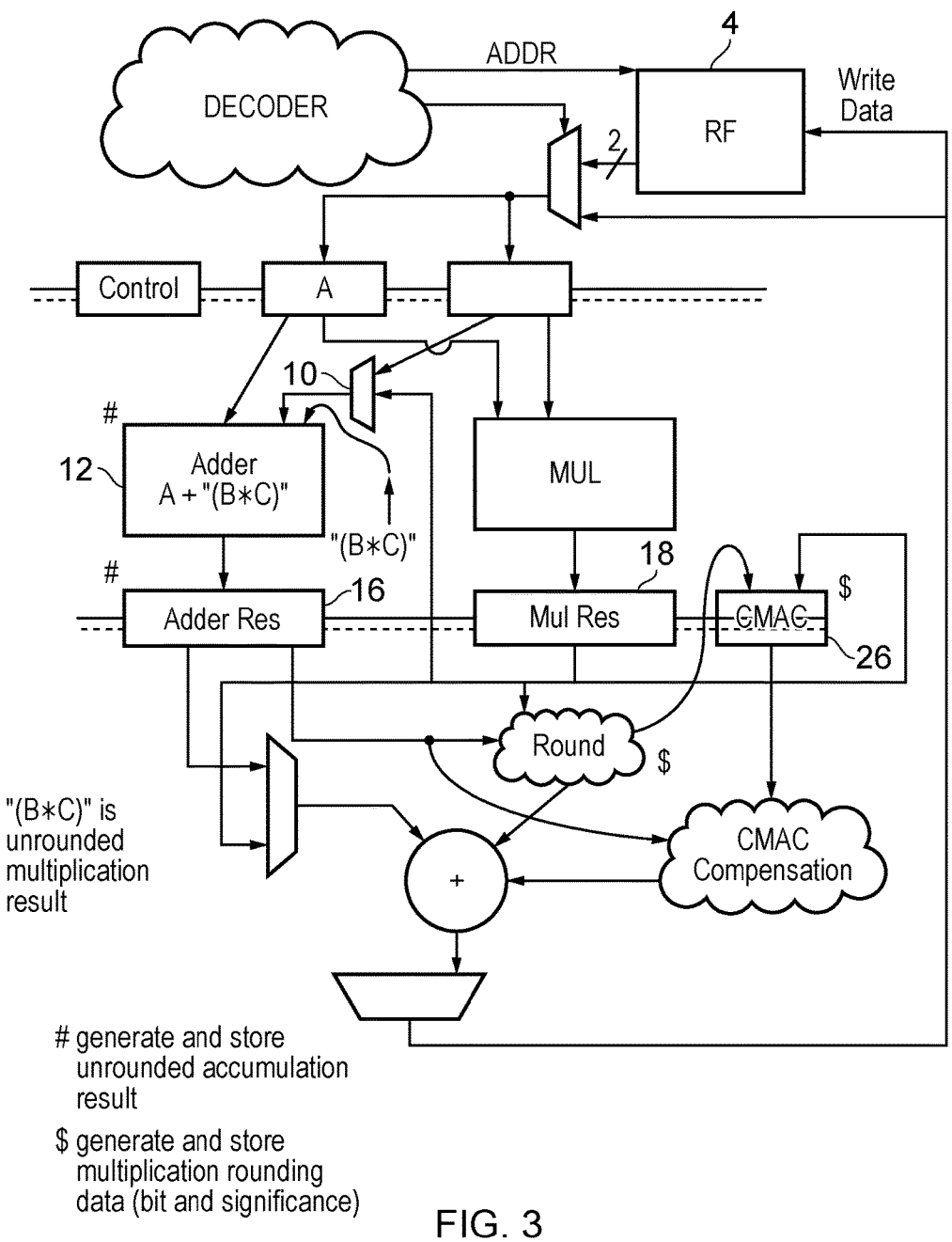

FIG. 3 schematically illustrates the circuitry of FIG. 1 during a second processing clock cycle of a floating point chained multiply accumulate operation. During the second processing cycle a third input operand A is read from the floating point register file 4 and supplied as one input operand to the adder 12. The unrounded multiplication result is read from the unrounded multiplication result register 18 and passed via the adder-input multiplexer 10 to the other input of the adder 12. Thus, the adder 12 during the second processing clock cycle serves to add the third input operand A to the unrounded multiplication result and generate an unrounded accumulation result which is stored within unrounded accumulation result register 16. Thus, the adder 12 and the unrounded accumulation result register 16 serve to generate and store an unrounded accumulation result.

In parallel with this accumulation operation, the rounding circuitry in the final state of the pipeline serves to generate multiplication rounding data from the unrounded multiplication result stored within an unrounded multiplication result register 18 and then to store this multiplication rounding data into a multiplication rounding data register 26. This multiplication rounding data includes a multiplication rounding bit (either a "0" or a "1") to be added to an unrounded value as well as a bit significance indicating the bit position the unrounded value into which the rounding bit is to be added. Thus, during the second processing clock cycle the rounding circuitry also serves to generate and store multiplication rounding data which includes both a bit value and the significance of that bit value.

Figure 4:
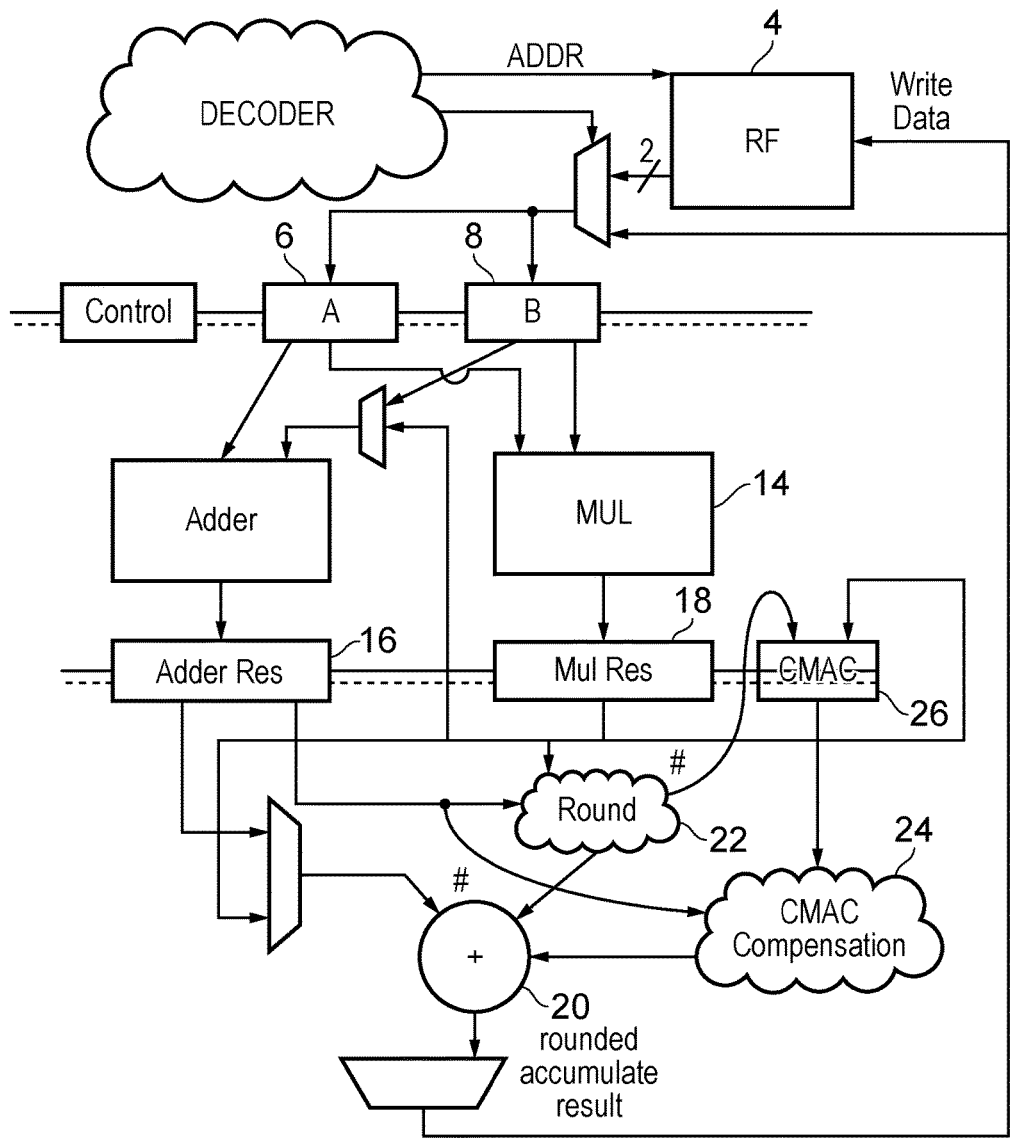

FIG. 4 schematically illustrates the operation of the circuitry of FIG. 1 during a third processing clock cycle while performing a floating point chain multiply accumulate operation. During this third processing clock cycle, rounding value determination circuitry 22 serves to generate accumulation rounding data which is supplied as one input to the carry-save adder 20. At the same time, the multiplication rounding data stored within the multiply accumulate rounding data register 26 is supplied via chained multiply accumulate compensation circuitry 24 (where it is subject to any adjustment required to take account of the late application of the rounding associated with the multiplication) and from where it is then passed to the carry-save adder 20 as another input operand. A third input operand to the carry-save adder 20 is the unrounded accumulation result from the unrounded accumulation result register 16. Thus, during the third processing clock cycle illustrated in FIG. 4, the rounding circuitry in the final stage of the pipeline serves to generate accumulate rounding data and the rounded accumulate result which is formed from a carry-save add of the unrounded accumulate result, the accumulate rounding data and the multiplication rounding data. The output from the carry-save adder 20 is the rounded accumulate result which is written back into the floating point register file 4.

Figure 5:
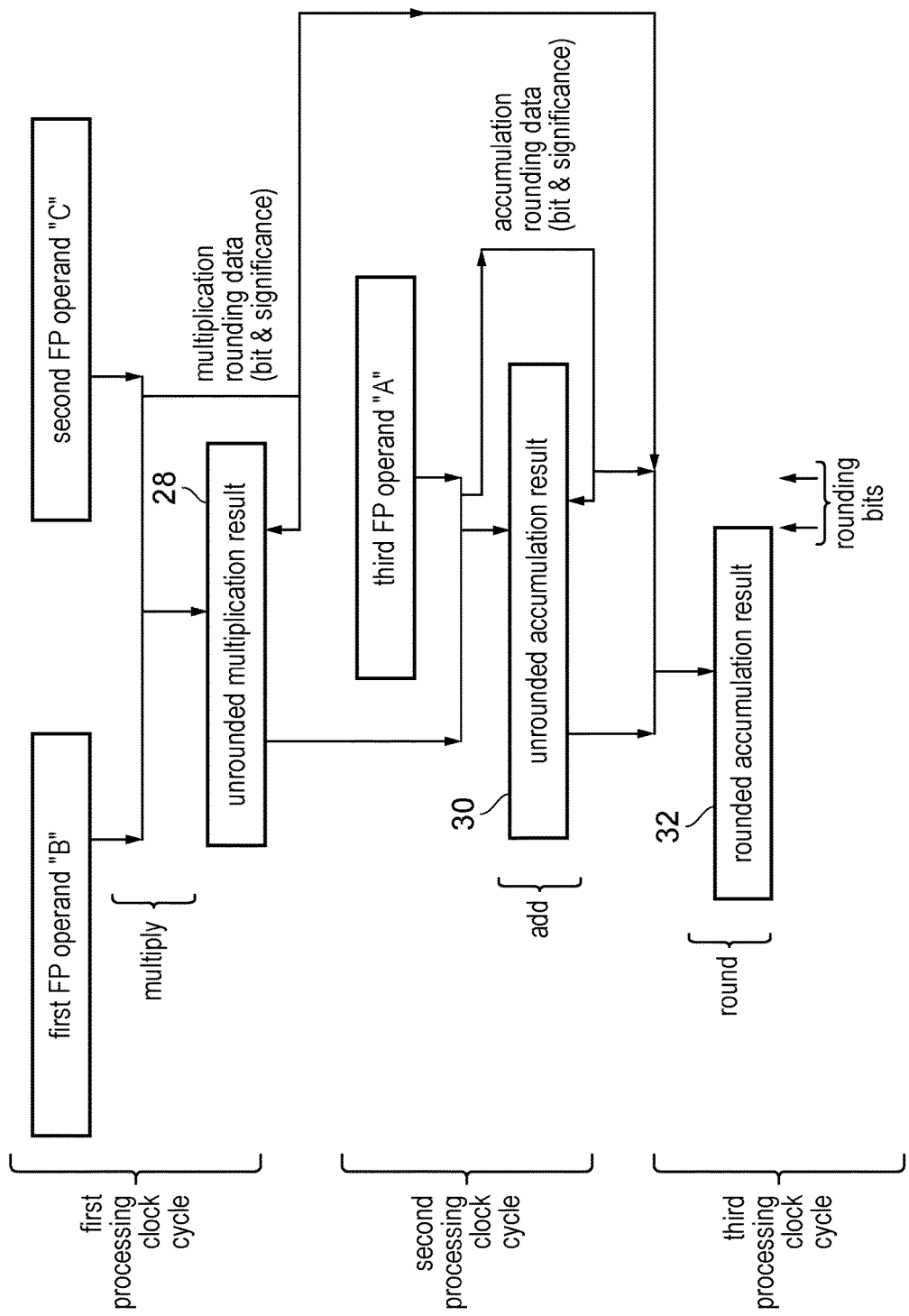
FIG. 5 schematically illustrates the relationship between input operands, intermediate results and a final result when performing a floating point chained multiply accumulate operation using the circuitry of FIG. 1.

FIG. 5 schematically illustrates the processing of the various input operands and their relationship to intermediate values during the floating point chained multiply accumulate operation described above. A first floating point input operand B and a second floating point input operand C are multiplied together during the first processing clock cycle to generate an unrounded multiplication result 28. The multiplication performed also results in multiplication rounding data (bit and significance) although in practice this may be generated during the second processing clock cycle. The unrounded multiplication result is then added to a third input operand A during the second processing cycle to generate an unrounded accumulation result 30. Also associated with the unrounded accumulation result is accumulation rounding data (bit and significance) although in practice this may be generated during the third processing clock cycle. During the third processing clock cycle the unrounded accumulation result 30 together with the multiplication rounding data and the accumulation rounding data serve as input to a rounding operation and generate a rounded accumulation result 32 which is the output of the chained multiply accumulate operation. The multiplication rounding data and the accumulation rounding data are subject to compensation such that the arithmetic result of the chained multiply accumulation operation in which all the rounding is performed in the final stage is the same as a conventional chained multiply accumulation operation during which the rounding of the intermediate multiplication result is performed and applied to that intermediate multiplication result before that intermediate multiplication result is added to the third input operand to perform the accumulate operation. Thus, in contrast to conventional chained multiply accumulate operations, the present technique serves to add together the unrounded multiplication result and the third input operand to generate an unrounded accumulation result which is then subject to rounding dependent upon two sets of rounding data, namely that resulting from the multiplication and that resulting from the accumulation.

Figure 6:
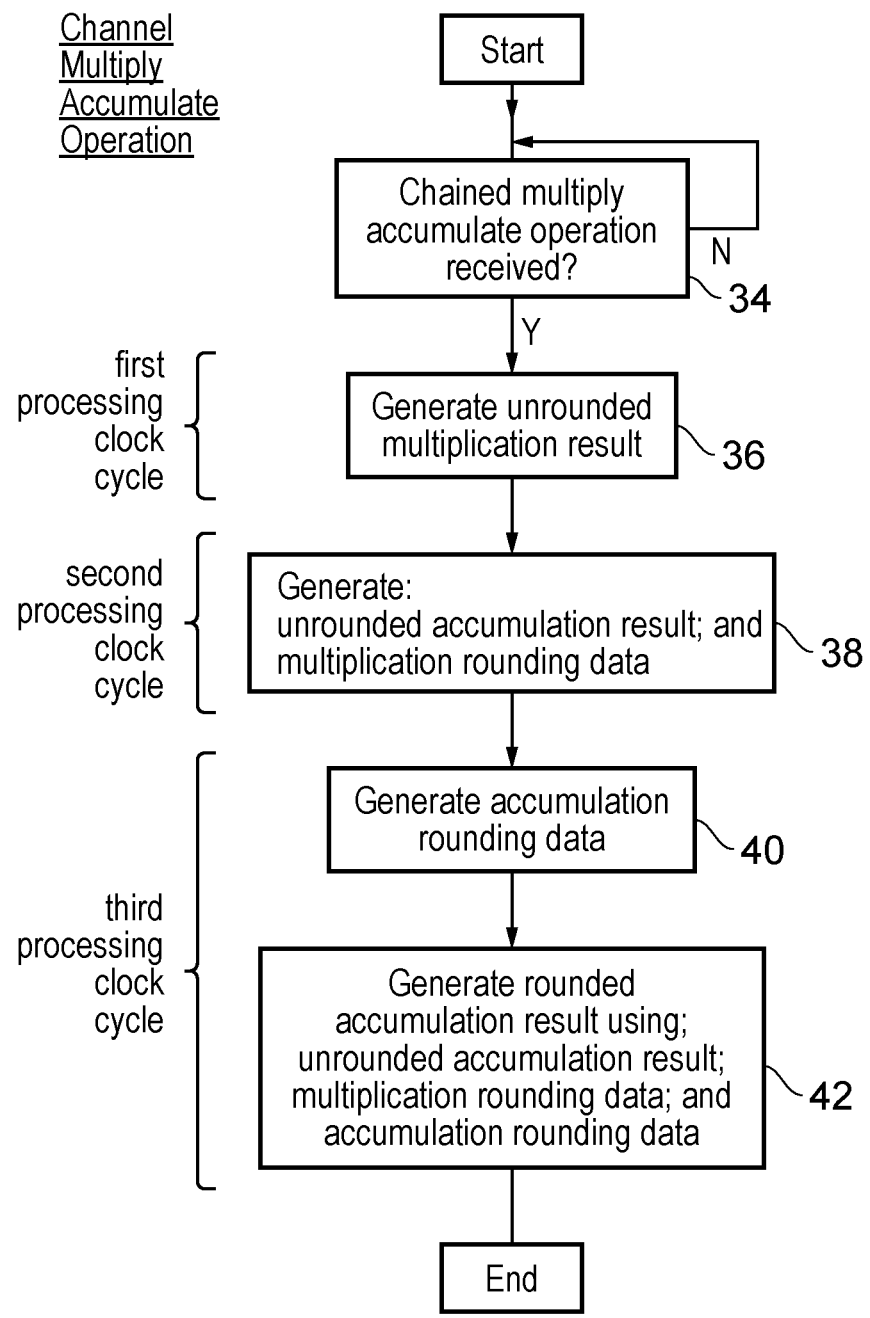
FIG. 6 is a flow diagram schematically illustrating the operation of the circuitry of FIG. 1.

FIG. 6 is a flow diagram schematically illustrating a chained multiply accumulate operation in accordance with the present techniques. At step 34 processing waits until a chained multiply accumulate operation is received. Step 36 serves to generate an unrounded multiplication result during a first processing clock cycle. Step 38 during a second processing clock cycle serves to generate an unrounded accumulation result by adding the unrounded multiplication result and the third input operand, and also to generate multiplication rounding data associated with the unrounded multiplication result. During a third processing clock cycle, step 40 first serves to generate accumulation rounding data from the unrounded accumulation result generated at step 38 and step 42 serves to generate a rounded accumulation result using a combination of the unrounded accumulation result, the multiplication rounding data, and the accumulation rounding data.

Background
Background Remarks about Floating Point Operations:

A number represented in floating point format consists of three fields, sign, exponent, and mantissa; concatenated in that order. The sign is a single bit, while the exponent and mantissa can have more than one bit. A number represented in floating point format is a concatenation of these three fields. A positive floating point number has the sign bit equal to zero, while a negative one has a sign bit equal to 1; and For practical purposes, rounding of a floating-point number after an operation like and add or a multiply needs four parameters: the sign of the number, the least significative bit of the number's mantissa, the rounding bit, and the jamming bit. Where the rounding bit is the most significative bit that is not represented in the mantissa; and the jamming bit is the OR of all the bits with less significance than the rounding bit. It is for this reason that a floating point result of an arithmetic operation includes the rounding and jamming bits, even when they fall outside of the range of bits with enough significance to be represented in the rounded final result.

CMAC Compensation Flops

This disclosure adds 8 new registers of varied bit length. These registers hold information available during the second clock cycle to be used during the third clock cycle; these are:
a) Zero_correction: it detects whether the A operand is zero (exponent=mantissa=0) AND the operation being carried out in the adder is like-signed (this means both operands have the same sign for an addition, or they have different signs for a subtraction) AND the rounded multiply result is zero (exponent=mantissa=0).
b) Sign_unrounded_mul_res: this is the sign of the unrounded multiply result being added in the second clock cycle XORed with a bit telling whether the operation is an addition or a subtraction.
c) A_eq_B: this bit detects whether the mantissa of the A operand is equal to the mantissa of the unrounded multiply result, AND the exponent of the A operand is equal to the exponent of the unrounded multiply result.
d) Mulres_exp_copy: this is a copy of the unrounded multiply result exponent.
e) Jamand_correction: it is an XOR of the most significative bits of each addend (operand A, or the unrounded multiply result). This means, one of the operands is subnormal, and the other isn't.
f) Cmac_jamand: it consists of three bits: a) the cumulative AND of all the mantissa bits of the
unrounded multiply result with a significance 25 bits lower than the significance of operand A. b) same as 'a' but including significances of 24 bits lower. c) same as b, but including significances of 23 bits lower. if operand A has a lower exponent than the unrounded multiply result, then all these three bits are set to zero.
g) Cmac_lsa: set to one when the addition is like-signed.
h) Missing_rounding: set to one when the unrounded multiply result needed to be rounded (add one).

Sign Computation

In the third clock cycle, the sign of the addition result is calculated, the IEEE 754 standard specifies that when the result of an addition is exactly zero and both addends are non-zero, then the sign must be positive or negative according to the rounding mode (function F). However since adding the unrounded multiply result introduces an error, then this disclosure handles the cases (#1) where the result of the rounded addition is exactly zero and both addends are non-zero, but the unrounded multiply result should have been zero because of the missing rounding.

In a standard floating point design, there are conditions (#2) to choose the addition result sign according to the rounding mode when the result is exactly zero, and both addends are non-zero. For case #1, when zero_correction is detected in the third clock cycle, this means that one of the operands (the unrounded multiply result) is really zero, and therefore the rounding mode should not play any role.

Figure 7:
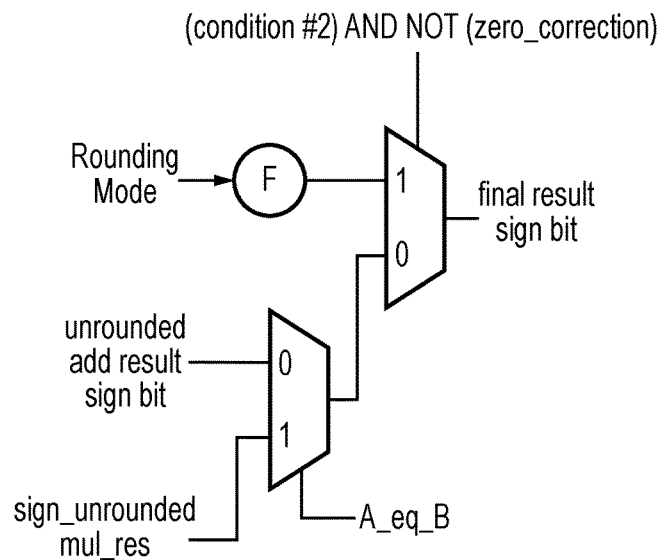
FIGS. 7 to 9 schematically illustrates portions of the compensation circuitry.

This disclosure implements the addition result rounding as depicted in FIG. 7. The role of A_eq_B is to always take the value of the unrounded multiply result in the third clock cycle when the addition result is non-zero due to the cmac compensation. This is so because in this case, the adder might wrongly take another choice for the sign bit, mainly because of the missing intermediate rounding.

Mantissa Computation

The mantissa and exponent computation also takes place in the third clock cycle. To help to the track the position where the missing rounding should have been located, the following circuit blocks are implemented:
b1) delta_exp: this is the difference in significance between the unrounded multiply result and the unrounded addition result, always observing that subnormals always have the same significance as minnormal, as defined in IEEE 754. Inputs: Mulres_exp_copy, and exponent of unrounded addition result.
b2) round_minus: this block detects whether the missing multiply rounding bit has become negative after the addition operation. Inputs: sign of unrounded addition result, Sign_unrounded_mul_res, A_eq_B.

b3) cmac_comp_mant_pos: this block calculates the mantissa compensation when it is positive, using the formula $2^{\wedge}(23-\text{delta\_exp})$. Its output is zero when delta_exp is negative or greater than 23. Inputs: delta_exp.

b4) cmac_comp_mant_neg: this block calculates the mantissa compensation when it is negative, this is done by setting to one all the bits at positions higher or equal than (23-delate_exp), clearing all the other bits in lower positions. Inputs: delta_exp.

b5) cmac_compjam: this block outputs a signal that detects whether the missing rounding from the multiply operation falls within the significance range of the jamming bit of the unrounded addition result, using the formula delta_exp<−1. Inputs: delta_exp.

b6) cmac_comp_rb: this block outputs a signal that detects whether the missing rounding from the multiply operation has the same significance of the rounding bit of the unrounded addition result, using the formula delta_exp==−1. Inputs: delta_exp b7) cmac_comp_mant: this block outputs a signal that detects whether the missing rounding from the multiply operation falls within the significance range of any of the mantissa bits of the unrounded addition result, using the formula delta_exp>−1. Inputs: delta_exp.

b8) cmac_comp_leadone: this block outputs a signal that detects whether the missing rounding from the multiply operation has the same significance of the leading one bit of the unrounded addition result, using the formula delta_exp==24. Inputs: delta_exp.

b9) cmac_jamand_rb: this block calculates whether the rounding bit of the unrounded addition result would be modified by a carry-in from the missing rounding bit of the multiply operation. Using the formula: ((jamand_correction XOR delta_exp[0]) AND Cmac_Isa AND Cmac_jamand[2] OR NOT(jamand_correction XOR delta_exp[0]) AND Cmac_jamand[1] OR (jamand_correction XOR delta_exp[0]) AND NOT(Cmac_Isa) AND Cmac_jamand[0]) AND cmac_comp_jam.

b10) cmac_exp_to_restore: this is the exponent to restore when the result of the unrounded addition is zero, calculated as: Mulres_exp_copy−23, use zero if Mulres_exp_copy<23.

b11) cmac_restore_exp: this block detects whether the exponent needs to be restored, for example, when the unrounded addition result became zero, but it shouldn't be if the missing rounding of the multiply operation had been considered. This can only happen when: NOT (cmac_Isa) AND A_eq_B AND (Mulres_exp_copy>=24).

b12) cmac_comp_carry_borrow: this block calculates whether a negative cmac compensation (originated when the missing rounding bit falls on either jamming or rounding bit of the unrounded addition result) produces a carry borrow to be propagated into the mantissa.

b13) cmac_comp_rb_f: indicates whether a carry in or carry borrow (originated by the missing rounding bit) at the position of the rounding bit of the unrounded addition result would propagate into the mantissa field of the unrounded addition result.

b14) newjam_bit: this is the jamming bit of the unrounded addition result had the missing rounding bit of the multiply operation been taken into account.

b15) missing_rounding_in_mantissa: set to one when the missing rounding falls within the mantissa field of the unrounded addition result. Calculated as: missing_rounding AND cmac_comp_mant.

b16) cmac_frac_ovfl_correction: set to one when the unrounded addition result mantissa would have overflowed if the missing intermediate rounding had taken place, and thus changed the rounding and lsb bits of the unrounded addition result due to the shift right to accommodate a higher exponent.

b17) new_lsb_bit: this is the lsb bit of the unrounded addition result that would have resulted if the missing intermediate rounding had taken place. No mantissa overflow is considered here.

b18) cmac_round_bit: this block calculates the rounding bit of the final result, e.g: whether or not to add 1 to the mantissa. This follows the rules described in IEEE 754, with the twist that the sign, lsb, rounding, and jamming bits its uses as inputs, are replaced with the sign, lsb, rounding, and jamming bit that would have been there if the missing round had been taken into account, this is done by replacing the lsb bit with new_lsb_bit, the jamming bit replaced with newjam_bit, and the rounding bit becomes cmac_comp_man_pos[1] AND unrounded addition result lsb bit when cmac_frac_ovfl_correction is set, or cmac_comp_rb_f XOR unrounded addition result rounding bit otherwise.

b19) cmac_compensation: finally, the cmac compensation is calculated as: $2^{\wedge}25$ when cmac_comp_leadone, OR cmac_comp_mant_neg when round_minus AND missing_rounding_in_mantissa, OR cmac_comp_mant_pos when NOT round_minus AND missing_rounding_in_mantissa, OR $2^{\wedge}25-1$ when cmac_comp_carry_borrow, OR 1 when NOT round_minus AND cmac_comp_rb_f AND unrounded addition result rounding bit. This is a collection of all possible cases the missing rounding bit is transformed into a suitable number to be added to the mantissa.

b20) compensated_mantissa: this is a carry-save addition of: unrounded addition result mantissa, +cmac_compensation, +cmac_round_bit shifted one position to the left if cmac_frac_ovfl_correction AND the unrounded addition result is not subnormal.

b21) frac_overflow: this calculates whether a mantissa overflow happens as a result of the addition of block #20.

b22) frac_underflow: this calculates whether a mantissa underflow happens as a result of the addition carried out in block #b20.

b23) final rounded mantissa result: this block selects the output of #b20 shifted one position to the left (concatenated with unrounded addition result rounding bit XOR cmac_comp_rb_f OR cmac_comp_carry_borrow) if there is an underflow signalled by #b22 and the unrounded addition result exponent is not min-normal; or the output of #b20 shifted one position to the right if there is an overflow signalled by #b21 or cmac_comp_leadone AND Missing_rounding; or the unchanged output of #b20 otherwise.

Figure 8:
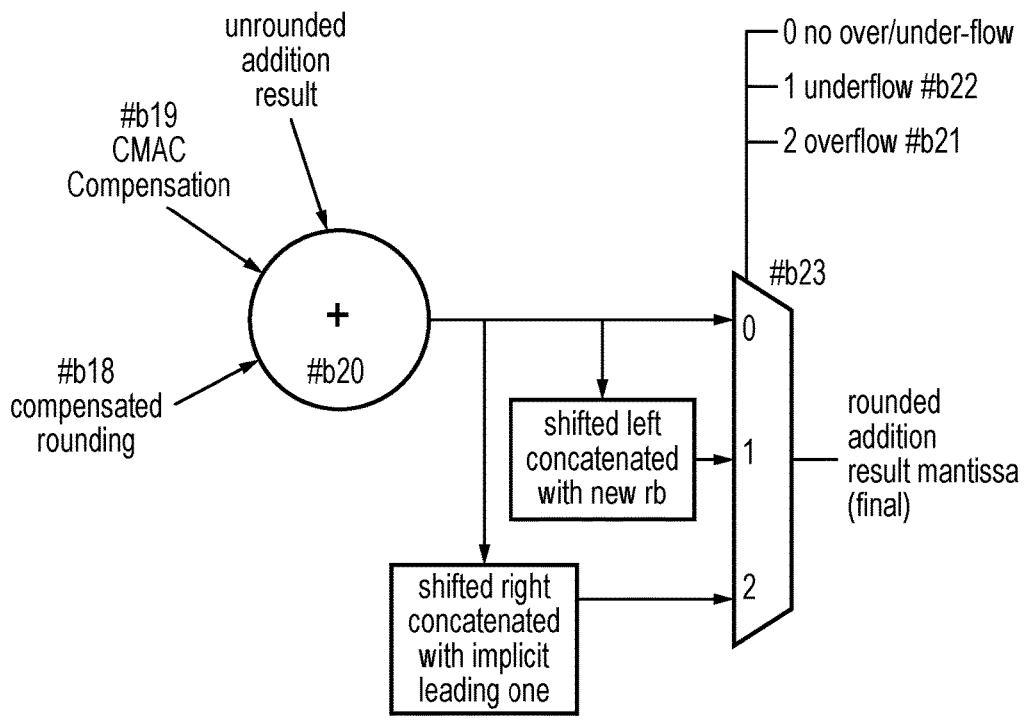

FIG. 8 shows the final mantissa result.

Exponent Computation

Figure 9:
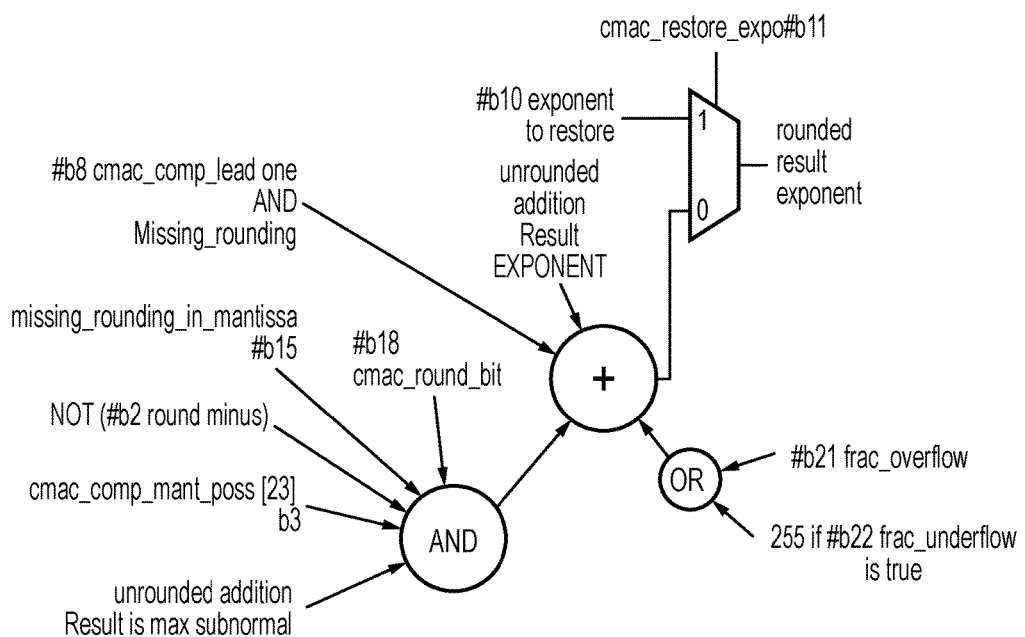

The Exponent Calculation May be Implemented as Depicted in FIG. 9.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for performing a floating point chained multiply accumulate operation, said apparatus comprising:
    a multiplier to multiply a first floating point operand by a second floating point operand to generate an unrounded multiplication result;
    an adder to add a third floating point operand and said unrounded multiplication result to generate an unrounded accumulation result; and
    rounding circuitry to generate:
        multiplication rounding data indicative of rounding associated with said unrounded multiplication result;
        accumulation rounding data indicative of rounding associated with said unrounded accumulation result; and
        a rounded accumulate result from said unrounded accumulate result, said multiplication rounding data, and said accumulation rounding data.

2. Apparatus as claimed in claim 1, wherein said rounding circuitry comprises a carry-save adder to add said unrounded accumulate result, a multiplication rounding value derived from said multiplication rounding data, and an accumulation rounding value derived from said accumulation rounding data.

3. Apparatus as claimed in claim 1, wherein said multiplication rounding data represents a multiplication rounding bit to be added to said unrounded multiplication result and a significance indicating a bit significance of said multiplication rounding bit.

4. Apparatus as claimed in claim 1, wherein said accumulation rounding data represents an accumulation rounding bit to be added to said unrounded accumulation result and a significance indicating a bit significance of said accumulation rounding bit.

5. Apparatus as claimed in claim 1, wherein said first floating point operand and said second floating point operand are supplied to said multiplier to generate said unrounded multiplication result during a first processing clock cycle.

6. Apparatus as claimed in claim 5, wherein said unrounded multiplication result and said third floating point operand are supplied to said adder to generate said unrounded accumulation result during a second processing clock cycle.

7. Apparatus as claimed in claim 6, wherein rounding circuitry generates said multiplication rounding data during said second processing clock cycle.

8. Apparatus as claimed in claim 7, comprising a multiplication rounding data register to store said multiplication rounding data generated during said second processing clock cycle.

9. Apparatus as claimed in claim 7, wherein said rounding circuitry generates said accumulation rounding data during a third processing clock cycle.

10. Apparatus as claimed in claim 9, wherein said rounding circuitry generates said rounded accumulation result from said unrounded accumulation result, said multiplication rounding data, and said accumulation rounding data during said third processing clock cycle.

11. Apparatus as claimed in claim 1, comprising a floating point register file to store said first floating point operand, said second floating point operand, and said third floating point operand, wherein said floating point register file comprises operand read circuitry supporting reading of up to two floating point operands from said floating point register file during a processing clock cycle.

12. Apparatus as claimed in claim 1, comprising an adder-input multiplexer to selectively supply said unrounded multiplication result from said multiplier as an input operand to said adder in combination with said third floating point operand.

13. Apparatus for performing a floating point chained multiply accumulate operation, said apparatus comprising:
    means for multiplying a first floating point operand by a second floating point operand to generate an unrounded multiplication result;
    means for adding a third floating point operand and said unrounded multiplication result to generate an unrounded accumulation result; and
    means for generating:
        multiplication rounding data indicative of rounding associated with said unrounded multiplication result;
        accumulation rounding data indicative of rounding associated with said unrounded accumulation result; and
        a rounded accumulate result from said unrounded accumulate result, said multiplication rounding data, and said accumulation rounding data.

14. A method of performing a floating point chained multiply accumulate operation, said apparatus comprising:
    multiplying, by a multiplier, a first floating point operand by a second floating point operand to generate an unrounded multiplication result;
    adding, by an adder, a third floating point operand and said unrounded multiplication result to generate an unrounded accumulation result; and
    generating, by rounding circuitry:
        multiplication rounding data indicative of rounding associated with said unrounded multiplication result;
        accumulation rounding data indicative of rounding associated with said unrounded accumulation result; and
        a rounded accumulate result from said unrounded accumulate result, said multiplication rounding data, and said accumulation rounding data.

* * * * *